Patented Feb. 5, 1935

1,990,460

UNITED STATES PATENT OFFICE 1,990,460

MANUFACTURE OF SPONGE RUBBER FROM LATEX OR RUBBER SOLUTIONS

Henry R. Minor, Oak Park, Ill., assignor to The Liquid Carbonic Corporation, Chicago, Ill., a corporation of Delaware No Drawing. Application October 26, 1932, Serial No. 639,745

6 Claims. (Cl. 18—53)

The present invention relates to a method of manufacturing sponge rubber from latex, it being the object of the invention to devise a workable and practicable process whereby the manufacture of cellular, or sponge rubber, may be accomplished directly from a water dispersion of rubber or natural latex.

It is the purpose of the invention to devise a means of making sponge rubber from latex in which the cells or pockets are formed by an inert gas such, for example, as carbon dioxide gas. The process is preferably carried out in the manner described herein, it being subject, however, to variations or modifications within the scope of the invention as set forth and claimed herein.

In order to manufacture sponge rubber directly from latex, the latex which is compounded or mixed with usual or standard compounding and vulcanizing ingredients, including accelerators, is thoroughly saturated and charged with the inert gas under pressure. This may be done either directly in the mold, or the latex may be charged in bulk and conducted to the mold without giving up its gas charge. The mold is provided with a suitable outlet which leads to a chamber provided with proper condensing coils, or the like, and with a trap through which water condensed within the chamber may escape. The chamber is provided with means for supplying the inert gas at the pressure which it is desired to maintain for the inert gas within the latex. As heat is applied and vulcanization progresses within the mold or vulcanizing chamber, the water will pass off as steam, and will be condensed within the condensing chamber. The pressure of the inert gas within the condensing chamber will prevent the escape of the inert gas from the body of the latex, and it will be held and entrapped therein during the vulcanization of the rubber, thereby forming the desired cellular or sponge rubber when vulcanization is completed.

In the case of carbon dioxide as the cell forming inert gas, a pressure of 15 pounds of carbon dioxide gas in the condensing chamber will balance a 15 pound charge of carbon dioxide gas in the latex. As the water passes off, the latex will vulcanize within the mold and the carbon dioxide gas will become entrapped in the cured mass.

The process which has been described for the manufacture of sponge rubber directly from a water dispersion of rubber (or latex), may be employed with appropriate changes to the manufacture of sponge rubber directly from solutions of rubber and vulcanizing ingredients. Thus, rubber in any suitable or commercial solvent medium, may be charged with inert gas under pressure, and may be cured in a mold having an outlet for the solvent which opens into a chamber or room in which is confined the balancing inert gas under pressure.

What is claimed is:

1. The process of manufacturing sponge rubber from latex, comprising adding to the latex vulcanizing ingredients, charging the latex with an inert gas under pressure, and subjecting the latex to vulcanization, permitting the water in the latex to escape therefrom but retaining the inert gas in the rubber by conducting the steam from the vulcanizing chamber and condensing it.

2. The process of manufacturing sponge rubber from latex, comprising adding to the latex vulcanizing ingredients, charging the latex with an inert gas under pressure, and subjecting the latex to vulcanization, permitting the water in the latex to escape therefrom by conducting the steam from the vulcanizing chamber and condensing it but retaining the inert gas in the rubber by balancing the inert gas within the latex by a body of inert gas under pressure outside the latex.

3. The process of manufacturing sponge rubber from latex, comprising adding to the latex vulcanizing ingredients, charging the latex with carbon dioxide gas under pressure, heating the latex until vulcanization is complete within a confined mold to vulcanizing temperature, and permitting the water to escape as steam from the latex by condensing the steam in a separate chamber but retaining carbon dioxide gas within the body of the latex by a counterbalancing body of the gas under pressure at the steam outlet.

4. The process of manufacturing sponge rubber directly from latex, comprising charging a mass of latex, to which vulcanizing ingredients have been added, with carbon dioxide gas under pressure until the body of the latex is permeated with the gas, and vulcanizing the latex while permitting the water to escape as steam, and conducting the steam to a separate condensing chamber but retaining the gas under pressure until the vulcanized sponge rubber is formed with cells charged with the carbon dioxide gas.

5. The process of manufacturing sponge rubber from a combination of rubber in a liquid vehicle vaporizable at approximately vulcanizing temperature and vulcanizing ingredients, the steps of charging the combination with an inert gas under pressure, subjecting the charged mass to vulcanizing temperature in a surrounding atmosphere of the inert gas under substantially the same pressure as that within the mass, condensing the vehicle and providing a seal through which the condensed vehicle may escape while retaining the surrounding gas under pressure.

6. The process of manufacturing sponge rubber from a dispersion containing rubber and a vulcanizing agent in a liquid medium which boils at a temperature below the vulcanizing temperature of rubber, which process comprises charging said dispersion with an inert gas under pressure, heating the charged mass in a confined chamber to a vulcanizing temperature while causing the liquid medium to volatilize and escape by separately condensing the same but retaining the inert gas within the rubber mass by a counterbalancing body of said inert gas under pressure.

HENRY R. MINOR.